United States Patent [19]
Jenkins

[11] 3,880,640
[45] Apr. 29, 1975

[54] BLOW HEAD WITH SOUND ENERGY ABSORBING MEANS

[75] Inventor: Charles W. Jenkins, Toledo, Ohio

[73] Assignee: Owens-Illinois, Inc., Toledo, Ohio

[22] Filed: Dec. 5, 1973

[21] Appl. No.: 421,746

[52] U.S. Cl. .......................... 65/261; 65/300; 65/81
[51] Int. Cl. ............................................. C03b 9/14
[58] Field of Search ................ 65/261, 262, 300, 81

[56] References Cited
UNITED STATES PATENTS
1,285,420    11/1918    Scull ..................................... 65/300
2,123,145    7/1938    Peiler ..................................... 65/262

FOREIGN PATENTS OR APPLICATIONS
310,421    2/1930    United Kingdom .................. 65/263

Primary Examiner—S. Leon Bashore
Assistant Examiner—Frank W. Miga
Attorney, Agent, or Firm—Steve M. McLary; E. J. Holler

[57] ABSTRACT

An improved blow-head assembly for reducing the noise of high pressure gas issuing from a parison of heated glass being blown into a final form in a final shape mold. The gas which is used to blow the parison is exhausted from the parison, either in a counterbored area in which the gas inlet blow tube is positioned or through a plurality of axial openings, and introduced to an exhaust chamber through a plurality of radial openings. The gas initially impinges on a sound energy-absorbing felt metal material. Then, baffles direct the gas in a tortuous path to a plurality of exhaust openings. The net result is a significant reduction in the sound level of the exhaust gas.

14 Claims, 4 Drawing Figures

BLOW HEAD WITH SOUND ENERGY ABSORBING MEANS

BACKGROUND OF THE INVENTION

This invention generally relates to blow heads which introduce a gas under pressure to a plastic preform shape to expand it into a final shape. More particularly, this invention relates to a blow head for an "IS" type glass container forming machine. Specifically, this invention relates to an improved blow head of the type described which significantly reduces the sound level of gas being exhausted from the preform during the expansion process.

In the manufacture of objects from glass and thermoplastic materials, a preform shape in a plastic state is expanded in a final shape mold by a gas under pressure introduced through a blow head. In particular, the well-known IS machine is used to manufacture glass containers. In this process, a preform shape or parison is expanded to its final shape in a final shape or blow mold. During this process, high pressure gas enters the parison and is exhausted, the exhaust being necessary to prevent back-pressure generation and to cool the parison. In the past, this exhaust gas generated a significant noise level. With the increasing emphasis on the improvement of industrial working environments, the noise has become a problem. While the prior art contains some suggestions for a solution, as noted in U.S. Pat. No. 3,137,560, the problem has not been solved prior to my invention. Direct muffling systems generate too much back pressure or are too bulky. Passing the exhaust gas through a material such as fiber glass causes the fiber glass to rapidly become clogged. Steel wool is ignited by the high temperatures of the exhaust. I have invented a compact and simple sound attenuation system for a blow head which impacts the exhaust gas on a metal felt to cause an energy loss and then directs the gas in a tortuous route to eventual discharge to further decrease the gas energy. In addition, the area of the exhaust openings are preferably ten times greater than the area of the inlet openings to still further decrease the gas velocity and consequently the exhaust noise level.

SUMMARY OF THE INVENTION

My invention is an improved blow head assembly for injecting a gas under pressure from a source into a parison contained at least partially within a final shape mold to expand the parison into conforming relationship with the final shape mold. One component of the blow head assembly is a main body member which includes a first passage means for directing gas from the source into the parison and a second passage means, communicating with the interior of the parison, for removing gas from the parison after the introduction of gas to the parison from the source. An exhaust chamber communicates with the second passage means. The exhaust chamber is in communication with the outside atmosphere. Sound energy-absorbing means are positioned within the exhaust chamber in a location such that gas from the parison must impinge on the energy-absorbing material before exiting from the exhaust chamber. The energy-absorbing material serves to partially absorb the energy of the gas from the parison.

DETAILED DESCRIPTION OF THE DRAWINGS

Figure 1:
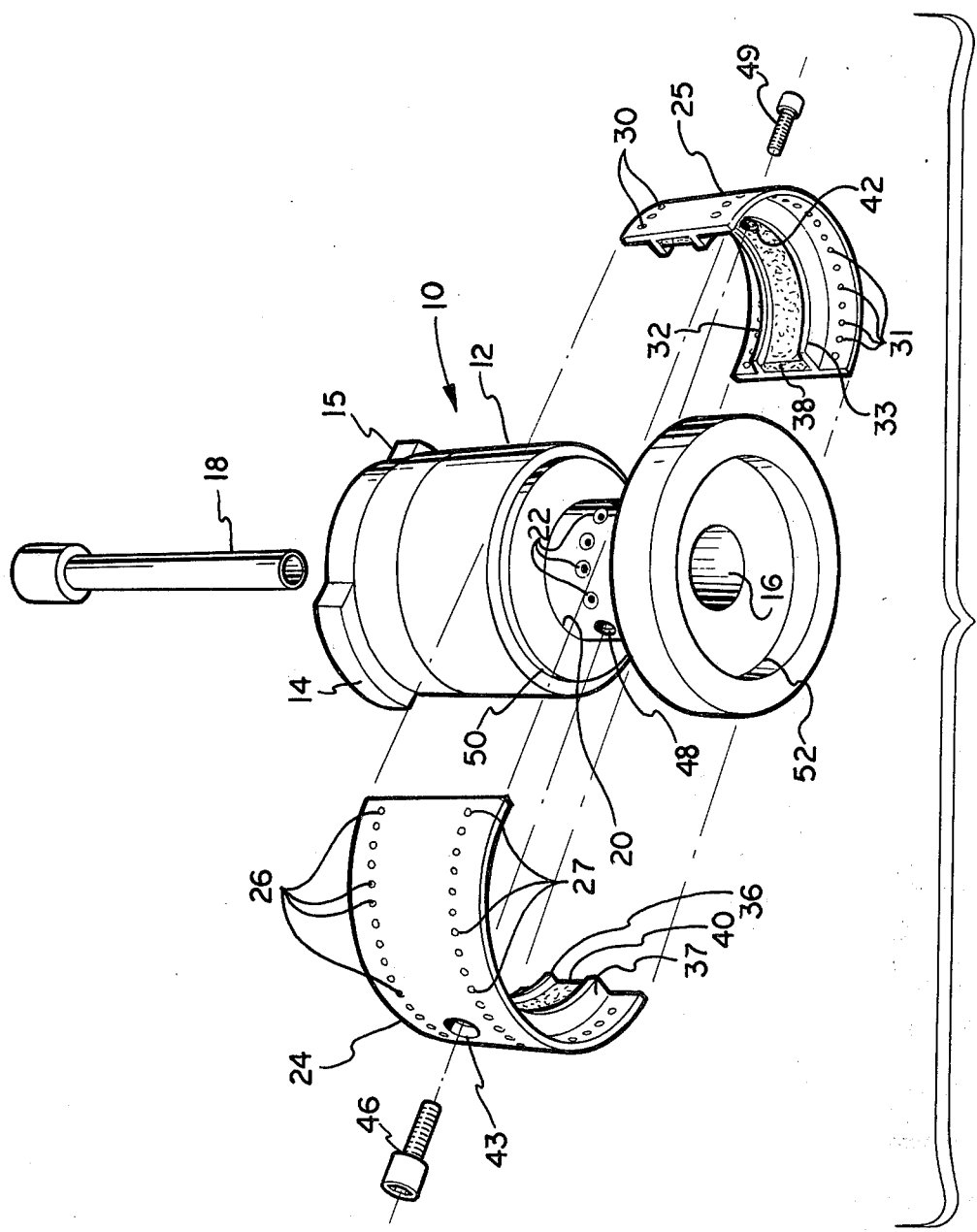
FIG. 1 is an exploded perspective view of one embodiment of the present invention.

FIG. 1 illustrates an exploded view of one embodiment of the improved blow-head assembly, generally designated as 10, of the present invention. The blow-head assembly 10 has as a major component a main body member 12, which is generally cylindrical in shape. The upper portion of the main body member 12 is formed with opposed bayonet locking lugs 14 and 15. The general operational environment of the blow-head assembly 10 may be seen with reference to U.S. Pat. No. 2,282,848. The blow-head assembly 10 is held in position on the arm which carries it by a bayonet-type lock which uses the bayonet lugs 14 and 15. An axial opening 16 extends completely through the main body member 12 and is generally located centrally with respect to the main body member 12. A blow tube 18 is inserted into the axial opening 16 when the blow-head assembly 10 is in its operational configuration. The blow tube 18 would be connected to a source of compressed gas, normally compressed air, for introduction into a preform or parison of molten glass. A relatively deep circumferential groove 20 is cut from the material of the main body member 12. In the bottom of the groove 20 may be seen the outlets for a plurality of radial openings 22 that are formed in the main body member 12. These radial openings 22 may best be seen in FIG. 2. When assembled, the circumferential groove 20 is closed by a cover means which may be the two semicircular cover plates 24 and 25. It should be pointed out at this time that the use of a circumferential groove 20 and semicircular cover plates 24 and 25 is primarily for the purpose of convenience in construction of the blow-head assembly 10. The muffling function, to be described later, could also be performed if the openings 22 were arranged in a linear array rather than in the circumferential array in which they are shown in FIG. 1. The circumferential array allows economy in space and ease of manufacturing. The cover plate 24 has drilled completely through it a plurality of upper openings 26 and a plurality of lower openings 27. The other cover plate 25 likewise has a plurality of upper openings 30 and a plurality of lower openings 31. One of the important relationships of this invention is the ratio of the overall cross-sectional area of the openings 26, 27, 30 and 31 to the cross section of the openings 22. The ratio of the area of the openings 26, 27, 30 and 31 to the area of the openings 22 is preferably between 5 and 10 and, if possible, should be at least 10 or more. The cover plate 25 has an upper baffle member 32 and a lower baffle member 33, each of the baffle members 32 and 33 extending generally radially inwardly from the inside surface of the cover plate 25. The other cover plate 24 likewise has an upper baffle 36 and a lower baffle 37, similar to the baffles 32 and 33. Note that the baffles 32, 33, 36 and 37 are positioned such that the openings 26, 27, 30 and 31 are above or below the various baffle members. This ensures that any gas which exits through the openings 26, 27, 30 and 31 must follow a tortuous path as defined by the baffles 32, 33, 36 and 37. Positioned between the baffle members 32 and 33 is an acoustical energy-absorbing material 38. The energy-absorbing material 38 is preferably a felt metal-type material which has a void percentage of from 20 percent to 90 percent. Preferably, the energy-absorbing material 38 is a felt-metal material having an eighty percent void ratio. A preferred thickness for the energy-absorbing material is approximately one-eighth of an inch thick. The pore size of the energy-absorbing material 38 should be in the range of from 50 to 500 microns. Suitable materials may be materials designated as FM-3107 or FM-1107 supplied by the Huyck Metals Company, 45 Woodmont Road, Milford, Conn. An energy-absorbing material 40 is likewise positioned between the baffle members 36 and 37 on the cover plate 24, and may be identical to the energy-absorbing material 38. An opening 42 is drilled completely through the cover plate 25 between the two baffle members 36 and 37. A corresponding opening 43 is provided through the cover plate 24. A threaded bolt 46 may be inserted through the opening 43 to engage a threaded opening 48 formed in the main body member 12. This allows the cover plate 24 to be securely fastened in place on the main body member 12. A corresponding bolt 49 may be inserted through the hole 42 in the cover plate 25 to engage a threaded hole, which is not visible in FIG. 1, in the body 12 to secure the cover plate 25 to the main body member 12. An upper lip 50 and a lower lip 51 (see FIG. 2) may be provided for accurately seating the cover plates 24 and 25 in a desired location. A final feature of the blow-head assembly 10 is a relatively large recessed area 52 at the lowermost portion of the blow-head assembly 10. The recess 52 is used to provide clearance over the finish of a glass container, as will be seen in FIG. 2. It should be noted that the recess 52 is not an essential part of the present invention, and should operating circumstances dictate that the finish portion of a container being blown into its final shape should be contained completely within the mold, the recess 52 would not be required.

Figure 2:
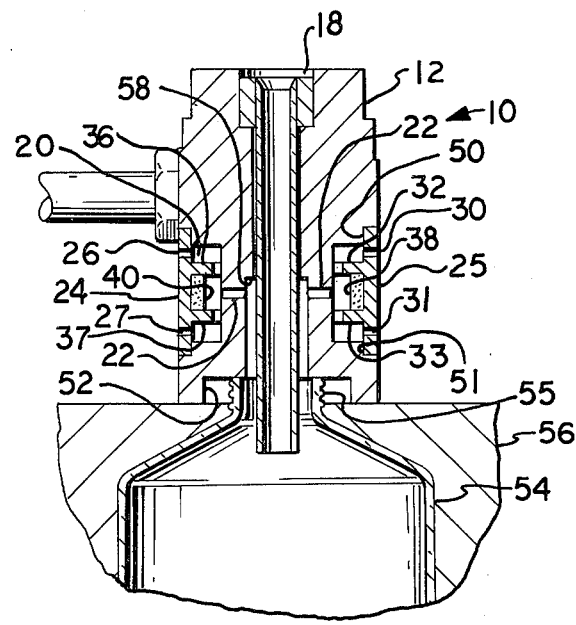
FIG. 2 is a cross-sectional elevation view of the embodiment of FIG. 1 in an assembled configuration in place on a final blow mold.

With respect now to FIG. 2, those skilled in the art are aware that a parison or preform shape 54, having a finish portion 55, is placed in a final shape mold 56. In the final shape mold 56, a gas under pressure, preferably compressed air, is injected into the parison 54 to cause the parison 54 to expand into a conforming relationship with the final shape mold 56. Note that the finish portion 55 fits within the recessed portion 52 of the main body member 12 since the finish portion 55 extends above the finish shape mold 56. The gas under pressure is introduced through the blow tube 18, which may now be seen is inserted into the axial opening 16, in a conventional and well-known fashion. The gas then enters the parison 54 and expands the parison into a conforming relationship with the shape of the interior cavity of the finish mold 56. The gas within the mold obviously must be exhausted to prevent a buildup of back pressure, and to provide for this exhaust, the axial opening 16 has a slightly expanded diameter counterbore 58 in its lower portion adjacent to the parison 54. Gas exiting from the blow tub 18 then moves up coaxially along the blow tube 18 in the expanded counterbore 58 until it reaches the openings 22. As previously noted, the openings 22 are radial openings which communicate with the counterbore 58. The gas then exits from the radial openings 22 and immediately impinges upon the energy-absorbing materials 38 and 40. This impingement upon the energy-absorbing materials 38 and 40 causes the gas to lose much of its velocity energy and achieves a substantial velocity decrease of the flow of gas. Then, the gas must follow a tortuous path around the baffles 32, 33, 36 and 37 to eventually exit through the openings 26, 27, 30 and 31. It will be noted that with the cover plates 24 and 25 in position over the circumferential groove 20, an exhaust chamber is thereby defined. In most general terms, one may consider the counterbore 58 and the radial passages 22 to be a second passage means formed within the main body member 12 for removing gas from the parison 54 and passing this gas into the exhaust chamber. The radial passages 22 thus serve as an inlet means for the exhaust chamber. The primary attenuation of the sound occurs because the high velocity air impinges on the energy-absorbing materials 38 and 40 which are chosen to create maximum noise attenuation in the high frequency range where the noise is most objectionable. (see "The Generation of Sound by Aerodynamic Means" by N. Curle, *Journal of the Royal Aeronautical Society*, November, 1961). This, in combination with the Helmholtz Resonator effect created by the total exhaust chamber, causes the major decrease in noise level. The openings 26, 27, 30 and 31 ensure that this decreased noise level is maintained and serve as an outlet means for the exhaust chamber. Because these openings are so much greater in a cross-sectional area than the openings 22, the air exits to the atmosphere at a relatively low velocity, thus preventing noise generation as a result of air stream velocity. The net result of this total configuration is that the noise of the gas exiting from the parison is substantially reduced. Under actual field test conditions, a noise level of from 97 to 100 db was measured with a standard blow head in use. With the improved blow-head assembly 10 of the present invention in use, the sound level was reduced to 89 db, which was the background noise level. Therefore, it is possible that the improved blow-head assembly of the present invention may reduce the overall noise level even more than is indicated by the measurements, since an accurate measurement of the precise degree of noise reduction was not possible due to the background level.

Figure 3:
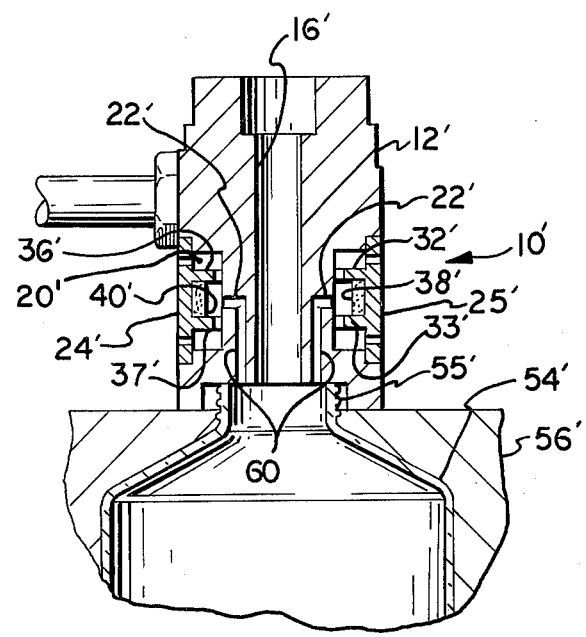
FIG. 3 is a cross-sectional elevation view of a second embodiment of the present invention.

FIG. 3 illustrates a somewhat modified blow-head assembly 10' similar to that shown in FIG. 2. The majority of the components in FIGS. 2 and 3 are similar or, in fact, identical, and therefore primed numbers will be used in FIG. 3 for elements that are similar and easily recognizable as comparable elements in FIG. 2. The embodiment shown in FIG. 3 is particularly useful in the event that a parison 54' is to be blown in a final shape mold 56' with a wider finish portion 55' than the finish portion 55 shown in FIG. 2. In such a situation, the blow tube 18 is not required. Thus, as seen in FIG. 3, the axial opening 16' itself serves as a first passage means for directing gas from the source into the parison 54'. In addition, it will be noted in FIG. 3 that the counterbore portion 58 near the lower portion of the axial opening 16 in FIG. 2 is not present in FIG. 3. The axial opening 16' in FIG. 3 extends through substantially the entire length of the main body member 12' without a change in dimension. At the lower end of the axial opening 16', a plurality of axially extending openings 60 are opened to communicate with the interior of the parison 54'. These axial openings 60 then communicate with radial openings 22' which again direct the jets of gas from the interior of the parison 54' into an impacting relationship with acoustical energy-absorbing material 40' and 38'. The energy-absorbing material 38' is held in position between upper and lower baffle members 32' and 33' in a cover member 25'. The energy-absorbing material 40' is held in position between upper and lower baffle members 36' and 37' in a cover member 24'. The operation of the exhaust chamber and muffling effect is identical in FIG. 3 with that previously described in FIG. 2, and it is believed that a detailed explanation of this muffling effect is not required again. It also may be appreciated that the plurality of axial openings 60 and the plurality of radial openings 22' may be considered to be a second passage means which communicate with the interior of the parison 54' for removing gas from the parison after the introduction of the gas into the parison from the source of gas.

Figure 4:
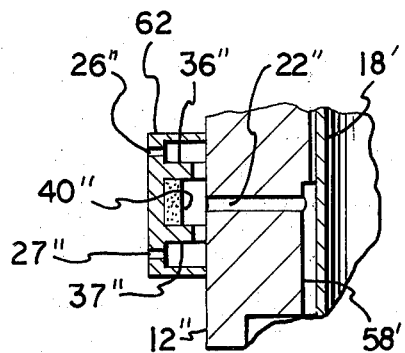
FIG. 4 is a fragmentary cross-sectional elevation view of a third embodiment of the present invention.

FIG. 4 illustrates an embodiment of the present invention which may be used on existing blow heads. The previously illustrated embodiments obviously require some modification to the standard blow-head body. In FIG. 4, the circumferential groove 20 has been eliminated. In this case, gas from the parison may flow around a blow tube 18' in an expanded diameter counterbore portion 58' of an axial opening 16''. The gas then flows outward in a plurality of radial openings 22''. The openings 22' are open to the outside of a main body member 12''. An exhaust chamber is defined by a hollow annular ring member 62. The ring member 62 is secured to the body member 12'' in any convenient manner, such as with threaded bolts. The ring member 62 has upper and lower baffle members, respectively 36'' and 37''. An acoustical energy-absorbing material 40'' is positioned between the baffle members 36'' and 37''. The gas exiting from the openings 22'' will impact on the energy-absorbing material 40'' to achieve an energy reduction function as previously explained. After passing around the baffle members 36'' and 37'', the gas may exit to the atmosphere through upper openings 26'' and lower openings 27'' in the ring member 62. The configuration shown in FIG. 4 may be described, as effective in noise attenuation as those previously shown and described but may be used on existing blow heads with minimal modification thereof.

What I claim is:

1. An improved blow-head assembly, connected to a source of gas under pressure, for injecting said gas under pressure into a parison contained at least partially within a final shape mold to expand the parison into conforming relationship with the final shape mold, comprising:
  a main body member which includes:
    first passage means, extending through said body member, for directing gas from said source into said parison; second passage means, in said body member, communicating with the interior of said parison, for removing gas from said parison after the introduction of gas to said parison from said source;
    an exhaust chamber, having inlet means and outlet means, said inlet means communicating with said second passage means, and said outlet means communicating with the outside atmosphere;
  and sound energy-absorbing means, positioned within said exhaust chamber opposite said inlet means, for partially absorbing the energy of said gas from said parison.

2. The improved blow-head assembly of claim 1, wherein said main body member is formed with a plurality of axially extending openings which communicate with the interior of said parison and a plurality of radially extending openings which communicate with said plurality of axial openings and said exhaust chamber to thereby define said second passage means.

3. The improved blow-head assembly of claim 1, wherein said main body member is formed with a circumferential groove in the exterior surface thereof; and further including cover means for enclosing said circumferential groove, said cover means including a plurality of openings for communication of said circumferential groove to the outside atmosphere, said circumferential groove and said cover means thereby defining said exhaust chamber.

4. The improved blow-head assembly of claim 3, wherein the ratio of the area of said openings in said cover means to the area of said second passage means is between 5 and 10.

5. The improved blow-head assembly of claim 3, wherein the ratio of the area of said openings in said cover means to the area of said second passage means is at least 10.

6. The improved blow-head assembly of claim 3, which further includes baffle members, attached to the interior of said cover means, extending radially toward said circumferential groove.

7. The improved blow-head assembly of claim 1, wherein said exhaust chamber comprises a hollow annular ring member attached to the outer surface of said main body member, said annular ring member having a plurality of openings formed therein communicating with the outside atmosphere.

8. The exhaust chamber of claim 7, which further includes baffle members, on the interior of said annular ring member, extending radially toward said outer surface of said main body member.

9. The improved blow-head assembly of claim 7, wherein the ratio of the area of said openings in said hollow annular ring member to the area of said second passage means is between 5 and 10.

10. The improved blow-head assembly of claim 7, wherein the ratio of said openings in said hollow annular ring member to the area of said second passage means is at least 10.

11. The improved blow-head assembly of claim 1, wherein said energy-absorbing means comprises a metal felt material having a void percentage of from 20 to 90.

12. The felt metal material of claim 11, wherein said void percentage is 80.

13. The improved blow-head assembly of claim 1, wherein said main body member is formed with a generally centrally located axial opening extending completely therethrough to thereby define said first passage means; and further including an annular blow tube, inserted in said axial opening, connected to said source of gas at one end and having the other end thereof in communication with the interior of said parison.

14. The improved blow-head assembly of claim 13, wherein said axial opening in said main body member is counterbored to a greater diameter adjacent the end of said blow tube in communication with said parison and wherein said main body member is formed with a plurality of radial openings communicating with said counterbored portion of said axial opening and said exhaust chamber, to thereby define said second passage means.

* * * * *